Patented Jan. 26, 1937

2,068,738

UNITED STATES PATENT OFFICE 2,068,738

BEVERAGE PRODUCTION

Howard File, Decatur, Ill., assignor to A. E. Staley Manufacturing Company, Decatur, Ill., a corporation of Delaware No Drawing. Application October 26, 1933, Serial No. 695,321

4 Claims. (Cl. 99—36)

The present invention pertains to the production of beer and similar beverages, and has particular reference to an improved adjunct to be used in connection with the barley or other basic material employed in the fermentation process by which such beverages are produced.

The basic process for making beer includes subjecting barley to a malting process and subsequently mashing the malted barley, the latter step causing the conversion of carbohydrates in the barley into fermentable form. In addition, certain of the proteins in the barley are rendered soluble by the mashing process. After the mashing process the resulting wort is fermented to produce the desired beverage, and finally filtered before being confined in closed containers for storage.

As malted barley has an enzyme content greater than that necessary to convert the starch of the barley by diastatic action into soluble, fermentable form, it is generally desirable to add other and less expensive starch-containing cereals such as corn grits to the mash, it being understood that the enzyme content of the barley acts to convert the starch of the grits into fermentable form.

In addition to starch-converting enzymes, the barley contains peptase or peptonizing enzymes which hydrolyze or otherwise convert the normally insoluble proteins into a soluble form.

As disclosed in many prior art patents, including, for example, Defren Patent No. 1,235,881, it has been found that these soluble proteins have an important influence upon the quality of the finished beer. In particular, the soluble protein derivatives increase the body of the beer, and thereby impart to it a better palate fullness. Also, the solubilized proteins have a foam stabilizing effect and act to increase the nutritive value of the beverage. To augment the natural protein content of the malt it has been suggested to add other organic nitrogeneous materials which will be solubilized by the peptonizing action of the barley or which have been rendered soluble by acid hydrolysis. However, many of these proteins are objectionable from various standpoints, including in some cases their precipitation or coagulation upon heating or standing, whereby the beer is rendered unattractive as a beverage.

A principal object of the present invention is to provide an improved brewer's adjunct and method of making the same.

An additional object is the provision of a process for making beer whereby to produce a finished product having the proper or desired content of soluble nitrogenous materials and satisfactory palate fullness, nutritional value, and foam stability.

In ordinary beer produced without the aid of adjuncts and in most beers made by a process including the addition of adjuncts such as corn grits, rice and the like, the protein content of the finished beverage generally is low. For example, this protein content ordinarily will not exceed 0.3 per cent to 0.4 per cent, whereas it is desirable in many cases to increase the protein content to from 0.6 per cent to 1 per cent or even more.

In accordance with my invention I have discovered an improved protein-containing material and method of forming and using the same as an adjunct in the brewing process whereby the process is simplified and there results a beverage which is of highly desirable characteristics. The particular protein-containing material which I have found may be used in the manner described is the concentrated steep water produced as a by-product of the corn products industry. I have found that the steep water improves the beer-like nature of the brew, imparting thereto such characteristics as a pleasing taste, foam stability, and palate fullness.

In the manufacture of various products from corn, the corn grain is customarily soaked or steeped in warm water containing sulfur dioxide until the corn is softened and substanial quantities of the water soluble constituents thereof are removed. The corn solubles extracted by the steeping process may be of the order of 6 per cent by weight of the corn. After the steep water is drawn off from the softened corn, it is concentrated by evaporation, usually under reduced pressure, to a concentration of approximately 60 per cent solids and 40 per cent water. The solid material in the concentrated steep water is about 50 per cent hydrolyzed proteins or amino compounds which are soluble in water, the remainder of the steep water including soluble carbohydrates, organic phosphates, and inorganic salts.

I have found that the steep water concentrate may be added directly to the remainder of the constituents employed in the process without preliminary acid hydrolysis or peptonization as has been necessary in the case of many protein materials used heretofore. For this reason, the amount of soluble proteins which are added is not limited by the peptonizing capacity of the malted barley, and the difficulties encountered heretofore in obtaining a hydrolyzed protein of satisfactory taste and keeping qualities are avoided. It is often preferred that the steep water be added to the process prior to the fermentation step in order that a satisfactory blend may be insured.

It has been my discovery that if the steep water is properly combined with starch-containing materials it may be kept for extended periods of time without deterioration and that the admixture of these materials affords a particularly satisfactory manner of handling the steep water. Since it is also desirable to add starch to the brewing process, the problem of handling the steep water has been solved to advantage in accordance with my invention by combining the two materials desirable for addition to the brewing process. By properly regulating the proportion of the adjunct constituents the characteristics of the finished product may be controlled in a satisfactory manner. The employment of refined starch as a carrier for the steep-water concentrate results in an ideal adjunct for brewing beer, the problem of filtering the wort being considerably simplified due to the absence of corn fibrous material which would be present if corn grits or similar material were used in place of the refined starch. Both the steep water and the refined starch are of such nature as not to unduly interfere with filtration, since neither has fibrous, insoluble constituents to clog up the filter openings. The protein content of the beer may be regulated to any desired quantity and a relatively greater quantity of adjunct as compared with the quantity of the more costly barley malt may be used.

In producing my improved adjunct I may use corn starch made in the usual manner by grinding degerminated corn, recovering the starch therefrom by water washing and removing the gluten from the starch by gravity separation. The starch is subsequently dried to about 12 per cent moisture and then conveyed to a mixer which may be of the order of 10,000 pounds capacity, for example. A sufficient quantity of concentrated steep water is added to the starch in the mixture so that for every ninety pounds of starch there is incorporated about ten pounds of concentrated steep water having a dry substance content of 60 per cent. The mixer therefore contains about 79.2 per cent of dry substance starch, 6 per cent of steep water solids, and 14.8 per cent of moisture. This combination of materials is thoroughly mixed and then conveyed to a suitable mechanism for further treating the starch to render it suitable for use in the mashing process. That is, the starch is gelatinized or semi-gelatinized so that it may be converted by enzyme action to fermentable sugar. Any suitable machine may be used for flaking the starch. For instance, the starch-steep water mixture may be passed through two flaking rolls. However, it is preferred to flake the starch-steep water adjunct by the process which includes passing the starch between an outer cone and an inner revolving cones, whereby the heat and friction of the cones are sufficient to partially gelatinize the starch. In such processes for gelatinizing starch, an amount of water which may approximate 2 per cent will be driven off. The final product will then have a content approximately as follows:

| | Per cent |
|---|---|
| Moisture | 13 |
| Corn starch | 80.8 |
| Steep water solids | 6.2 |

After preparation as described, the adjunct may be shipped in the ordinary manner without special precautions being taken for the preservation of the steep water. When used, the starch-containing adjunct is added to the process prior to the mashing step in order that the starch of the adjunct may be converted into a fermentable form by the enzyme action of the malt.

In any case, the use of steep water simplifies the problem of obtaining a finished beer having a relatively high soluble protein content and this content remains soluble even though the beer is stored for a considerable period. A particular advantage of this form of adjunct is in its flexibility of content. That is, the ratio of constituents may be considerably varied. For instance, if it is desired to produce a beer having a high alcoholic content the adjunct may be so prepared that the ratio of starch to steep water is lower than in beverages in which it is preferred to have a lower alcoholic content as compared with the amount of soluble proteins. All such variations and modifications are intended to be included in the appended claims.

I claim:

1. A process for making beer and the like, which comprises subjecting malt to a mashing step to produce a wort, subjecting the wort to alcoholic yeast fermentation to produce an alcoholic liquid, and adding concentrated corn steep water to the material treated prior to the fermentation step.

2. In a process of making beer which comprises subjecting malt to a mashing step to produce a wort, subjecting the wort to alcoholic yeast fermentation and filtering the product thereof, the improvement which consists in adding concentrated corn steep water to the treated material prior to the filtration step.

3. A process for making beer, which comprises subjecting malt and an adjunct including starch and concentrated corn steep water to a mashing step, and subjecting the resulting wort to alcoholic yeast fermentation to produce a beverage.

4. A process for making beer, which comprises subjecting malt and an adjunct including concentrated corn steep water to a mashing step, and subjecting the resulting wort to alcoholic yeast fermentation to produce a beverage.

HOWARD FILE.